Dec. 18, 1928.

A. W. CAPS 1,695,481

PHOTOGRAPHIC COPYING MACHINE

Filed June 26, 1925  2 Sheets-Sheet 2

INVENTOR.
Arthur W. Caps.
BY Arthur C. Brown
ATTORNEY

Patented Dec. 18, 1928.

1,695,481

UNITED STATES PATENT OFFICE.

ARTHUR W. CAPS, OF KANSAS CITY, MISSOURI, ASSIGNOR TO PHOTOSTAT CORPORATION, OF PROVIDENCE, RHODE ISLAND, A CORPORATION OF RHODE ISLAND.

PHOTOGRAPHIC COPYING MACHINE.

Application filed June 26, 1925. Serial No. 39,753.

This invention relates to photographic copying machines so constructed that an object may be projected against a sensitized sheet which, upon being developed, will produce a "positive" photograph without the necessity of employing a negative.

Such devices are usually employed for copying documents, records and the like and it is frequently desirable to photograph on both sides of the sensitized sheet so that sheets can be bound in a volume with photographic printing on both sides of the sheet so that the book will be arranged in pages.

In order to accomplish the desired result, it is necessary that both sides of the sensitized sheet be presented to the mechanism for projecting the image onto the sheet when the exposure is made, so I have provided a simple, novel form of sensitized sheet holder supporting device, a novel form of copy holder for holding the object to be photographed, and appropriate mechanism between the two so that when one is reversed, a synchronous movement is imparted to the other.

In the present embodiment of my invention, the copy holder is the controlling element which determines the reversing movement of the sensitized sheet holder and in the present invention both the copy holder and the sensitized sheet holder are so arranged that the reversal of the two may take place in axial alignment with a single projecting apparatus.

The novelty of the invention will be clearly understood by reference to the following description in connection with the accompanying drawings, in which—

Figure 1:
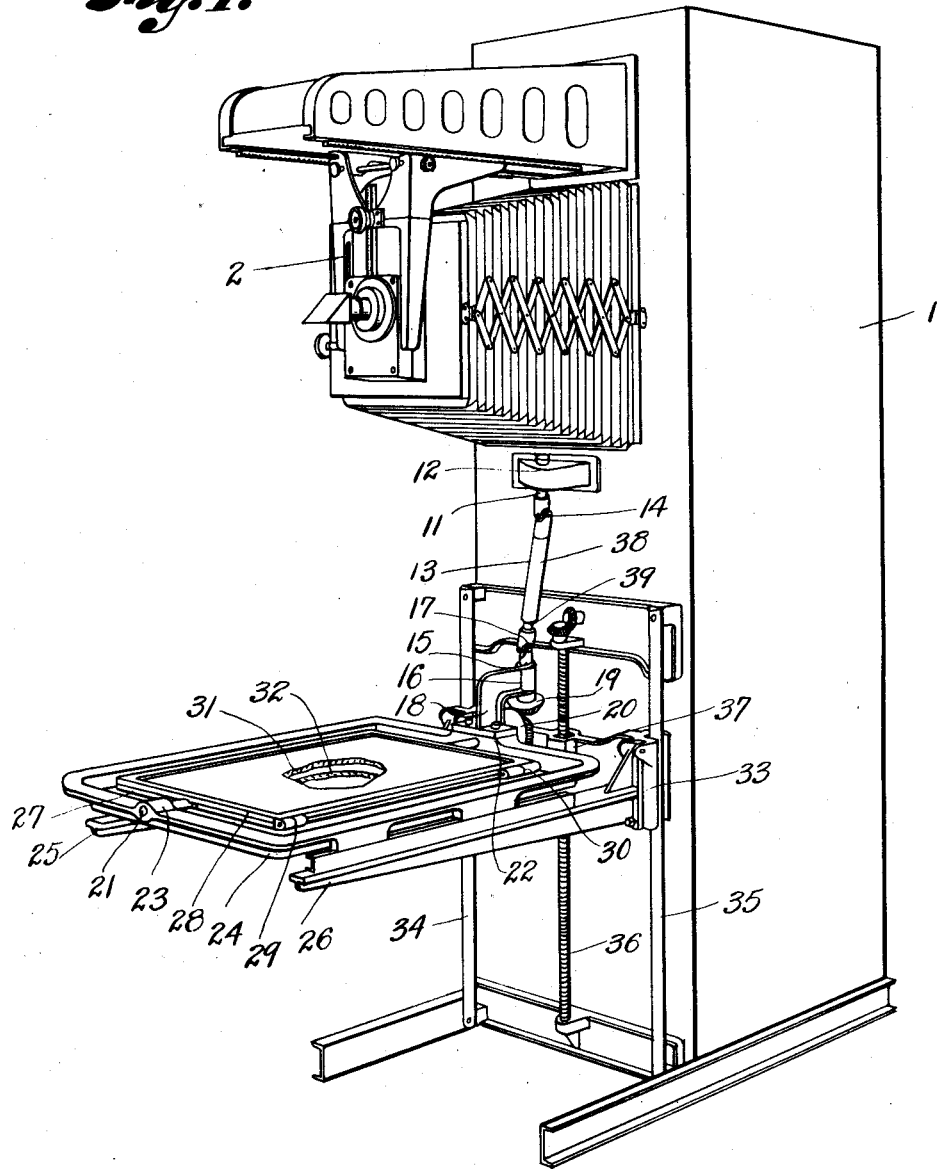
Figure 2:
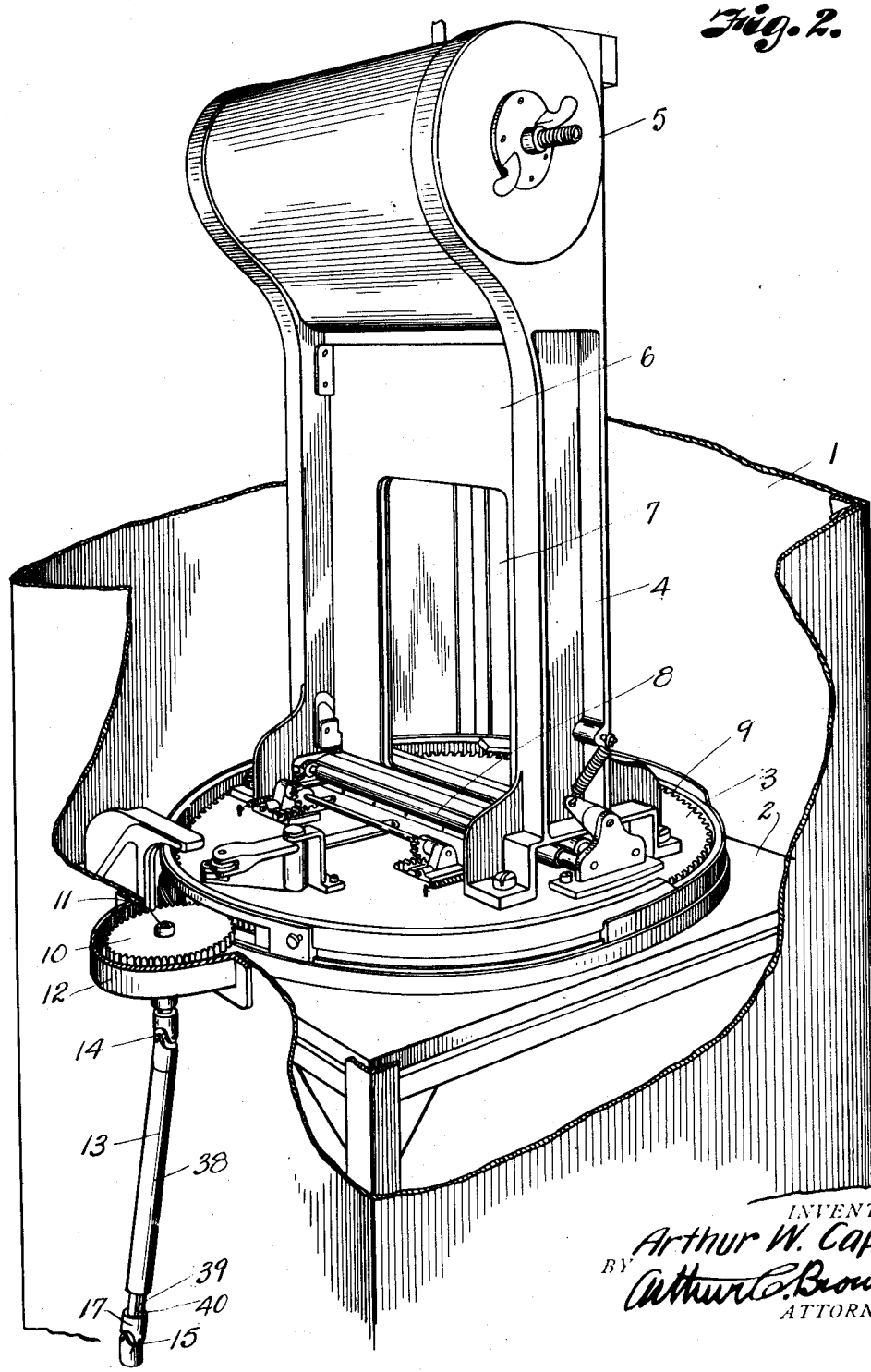

Fig. 1 is a perspective view of a photographic copying machine constructed in accordance with my invention, and Fig. 2 is a perspective view of the reversible sensitized sheet holder, part of the casing being shown.

1 designates an upstanding, substantially rectangular casing provided with an object-projecting apparatus indicated as a camera 2. The camera has all of the necessary appurtenances for projecting the object from the copy holder onto the sensitized sheet holder and inasmuch as the camera is of known construction, it is deemed unnecessary to elaborate upon the details thereof in this description.

Within the casing 1 is a suitable support 2 on which is a turntable 3 carrying an upstanding sensitized sheet holder 4. The sheet holder is provided with a casing 5 at its top in which the spool containing a strip or elongated sheet of flexible sensitized material may be wound. The material is usually paper, sensitized on both sides, and it may be fed through the mask 6 to the bottom, past the opening 7 and through the rollers 8 to the casing below the support 2. There is usually a knife or paper-cutting apparatus employed which cuts the strip into sheets but the details of the cutting apparatus constitute the subject matter of another application; this particular case being devoted exclusively to the reversing mechanism for the sensitized sheet holder and the copy holder.

The periphery of the turntable 3 is provided with a gear or gear teeth 9, which mesh with the gear teeth of the pinion 10 on a stub shaft 11, carried by the portion 12 of the case 1. The stub shaft 11 projects downwardly outside the casing and it is connected to a shaft 13 through a universal joint 14, the shaft 13 in turn being connected to the vertical shaft 15 in a bearing 16 by a universal joint 17.

The shaft 15 extends below the bearing 16 in a bracket 18 and it carries a miter gear 19 which meshes with a miter gear 20 on the shaft 21 mounted in bearings 22 and 23 in the table frame 24, supported by the brackets 25 and 26 on the front of the casing 1. The shaft 21 constitutes a longitudinally disposed, centrally located pivot for a copy holder consisting of two frames 27 and 28 hinged together at 29 and 30 and having transparent panels 31 and 32 so that the object to be photographed may be placed between the panels in line with the camera so that when an exposure is made, the object visible through the panel 32 will be projected into the casing 1 onto one face of the sensitized sheet exposed through the opening 7 and when the copy holder is reversed by turning it on its pivot 21, the gear 20 will be rotated 180 degrees, imparting a like motion to the gear 19 which, through the shafts 11, 13 and 15, will rotate the pinion 10 and through it rotate the turntable 180 degrees to present the opposite face of the paper or sensitized sheet to the projecting apparatus. Consequently, when the second exposure is made, the opposite side of the paper will be exposed. The paper may then be removed from the machine and developed in the usual way.

The bracket table 33 which carries the bracket arms 25 and 26 is slidable upon two vertical guide rods 34 and 35 and it is adjustable vertically through the medium of the screw 36 which passes through a threaded block 37 so that the copy holder may be focused with respect to the lens of the camera and inasmuch as the vertical movement of the copy holder will require some flexible connection between it and the turntable, I make the shaft 13 of two parts, one a sleeve 38 and the other a rod 39, having a spline 40 to engage in a complementary groove inside the sleeve 38.

When the parts are assembled, the object or objects to be printed may be placed between the panels 31 and 32, one being visible through the panel 31 and the other through the panel 32. Upon making the exposure the object visible through one panel, for example 32, will be projected photographically upon one side of a sensitized sheet or strip visible through one side of the opening 7. Then the copy holder can be turned through an angle of 180 degrees to present the panel 31 to view; that is, make it the uppermost panel.

During the rotative movement of the copy holder, the turntable 3 will be turned to present the opposite face of the paper to the projecting apparatus, whereupon a second exposure can be made. The sheet is then fed by suitable means downwardly at least a length of the exposed portion and severed so that the sheets may be collected from the casing 1 and developed in the usual way.

What I claim and desire to secure by Letters-Patent is:

1. In a photographic copying machine, the combination with a camera body embodying a lens, of a reversible support for sensitized sheet material mounted within the casing in the focal plane of the lens, said holder being rotatable about a fixed axis, a multiple-faced copy holder arranged exteriorly of the camera body and having central pivots adapting it to be reversed in the region of the other focal point of the lens, and gearing connecting the reversible support and the copy holder for communicating synchronized movement from one of said elements to the other.

2. In a photographic copying machine, the combination with a camera body embodying a lens, of a reversible support for sensitized sheet material mounted within the casing to present first one side and then the other of sheet material sensitized upon both sides in the focal plane of the lens, a multiple-faced copy holder arranged exteriorly of the camera body and adapted to be reversed in the region of the other focal point of the lens, and gearing connecting the reversible support and the copy holder for communicating synchronized movement from one of said elements to the other.

3. In a photographic copying machine, a casing having means for projecting an image into the casing, a turntable within the casing having a gear about its periphery, a sensitized sheet holder on the turntable in line with the projecting means, a pinion meshing with the gear, a reversible copy holder outside the casing in line with the projecting means, a central pivot for the copy holder, a gear on the pivot, a gear meshing with the gear on the pivot, and connections between the last-named gear and the pinion.

4. In a photographic copying machine, a casing having means for projecting an image into the casing, a turntable within the casing having a gear about its periphery, a sensitized sheet holder on the turntable in line with the projecting means, a pinion meshing with the gear, a reversible copy holder outside the casing in line with the projecting means, a central pivot for the copy holder, a gear on the pivot, a gear meshing with the gear on the pivot, and universal connections between the last-named gear and the pinion.

5. In a photographic copying machine, a casing having means for projecting an image into the casing, a turntable within the casing, an upstanding sensitized sheet holder carried by the turntable having a plurality of faces adapted to be brought into line with the projecting means, a copy holder outside the casing having a plurality of faces adapted to be brought into line with the projecting means, and connections between the turntable and the copy holder to synchronize the movements of the turntable with those of the copy holder.

6. In a photographic copying machine, a casing having means for projecting an image into the casing, a reversible sensitized sheet holder in the casing rotatable about a fixed axis in line with the object projecting means, a centrally pivoted, multiple faced copy holder outside the casing, mechanical connections between the copy holder and the reversible sensitized sheet holder for synchronizing the movements of one by those of the other, said means comprising a telescopic shaft, and means for adjusting the copy holder with respect to the projecting means.

7. In a photographic copying machine, a casing having means for projecting an image into the casing, a reversible sensitized sheet holder within the casing, a reversible copy holder outside the casing, a gearing for rotating the sensitized sheet holder including a stub shaft, a gearing rotatable by the copy holder including a stub shaft, a third shaft, and universal joints between the ends of the third shaft and the stub shaft.

8. In a photographic copying machine, a casing having means for projecting an image into the casing, a reversible sensitized sheet holder within the casing, a reversible copy holder outside the casing, a gearing for rotating the sensitized sheet holder including a stub shaft, a gearing rotatable by the copy holder including a stub shaft, a third shaft, the third shaft comprising two telescopic members, and universal joints between the ends of the third shaft and the stub shaft.

In testimony whereof I affix my signature.

ARTHUR W. CAPS.